United States Patent
Cui

(10) Patent No.: US 12,012,942 B2
(45) Date of Patent: Jun. 18, 2024

(54) SUPPORT DEVICE AND WIND GENERATING SET

(71) Applicant: BEIJING GOLDWIND SCIENCE & CREATION WINDPOWER EQUIPMENT CO., LTD., Beijing (CN)

(72) Inventor: Yufei Cui, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 106 days.

(21) Appl. No.: 17/997,209

(22) PCT Filed: Sep. 14, 2020

(86) PCT No.: PCT/CN2020/115037
§ 371 (c)(1),
(2) Date: Oct. 26, 2022

(87) PCT Pub. No.: WO2021/217996
PCT Pub. Date: Nov. 4, 2021

(65) Prior Publication Data
US 2023/0193881 A1 Jun. 22, 2023

(30) Foreign Application Priority Data
Apr. 27, 2020 (CN) .......................... 202010342220.8

(51) Int. Cl.
*F03D 80/80* (2016.01)
*F03D 13/20* (2016.01)
*F16M 11/32* (2006.01)

(52) U.S. Cl.
CPC ............ *F03D 80/82* (2016.05); *F03D 13/20* (2016.05); *F16M 11/32* (2013.01)

(58) Field of Classification Search
CPC .......... F03D 80/82; F03D 13/20; F16M 11/32
See application file for complete search history.

(56) References Cited

U.S. PATENT DOCUMENTS

| 4,570,749 A | * | 2/1986 | McKibbin | ................. E04G 3/28 182/36 |
| 5,301,770 A | * | 4/1994 | Regan | ...................... E04G 3/30 182/128 |

(Continued)

FOREIGN PATENT DOCUMENTS

| CN | 102136511 A | 7/2011 |
| CN | 104612908 A | 5/2015 |

(Continued)

OTHER PUBLICATIONS

Written Opinion of the International Searching Authority; WO2021217996 (PCT/CN2020/115037); Jan. 27, 2021 (Year: 2021).*

(Continued)

*Primary Examiner* — Pedro J Cuevas
(74) *Attorney, Agent, or Firm* — Frank Gao, Esq.

(57) ABSTRACT

A support device (1) and a wind generating set. The support device is used for the wind generating set, and the wind generating set comprises an electrical apparatus (3). The support device comprises: a support frame (10) which is of a hollow frame structure and comprises a plurality of beam structures (11), wherein the adjacent beam structures are connected to each other, and a relative position between at least one set of two beam structures with a connection relationship is adjustable; and a support platform (20) arranged on one surface of the support frame in a height direction of the support frame and connected to the beam structure, wherein the support platform is used for supporting the electrical apparatus. The device can be used for supporting the electrical apparatus of the wind generating set, and at the same time, the size and/or bearing capacity (Continued)

can be changed according to apparatus requirements, and a better universality is achieved.

19 Claims, 13 Drawing Sheets

(56) References Cited

U.S. PATENT DOCUMENTS

| | | | | |
|---|---|---|---|---|
| 6,364,609 | B1 * | 4/2002 | Barnes | F03D 3/005 416/142 |
| 8,418,810 | B2 * | 4/2013 | Barr | E04G 3/30 182/148 |
| 2011/0073411 | A1 * | 3/2011 | Barr | E04G 3/30 182/152 |
| 2011/0254277 | A1 | 10/2011 | Murata | |
| 2013/0174508 | A1 | 7/2013 | Reed et al. | |
| 2016/0052606 | A1 * | 2/2016 | Dekker | B63B 27/19 114/364 |
| 2017/0141721 | A1 * | 5/2017 | Schmidt | F21V 21/22 |
| 2017/0218919 | A1 * | 8/2017 | Wong | F03D 7/0204 |
| 2019/0368473 | A1 | 12/2019 | Soerensen | |

FOREIGN PATENT DOCUMENTS

| | | | | |
|---|---|---|---|---|
| CN | 105026750 | A * | 11/2015 | ............ F03D 13/10 |
| CN | 206195684 | U | 5/2017 | |
| CN | 208236581 | U | 12/2018 | |
| CN | 208675142 | U | 3/2019 | |
| CN | 208763821 | U | 4/2019 | |
| CN | 208845309 | U | 5/2019 | |
| CN | 209228542 | U | 8/2019 | |
| CN | 110203858 | A | 9/2019 | |
| CN | 110307124 | A | 10/2019 | |
| CN | 209482684 | U | 10/2019 | |
| DE | 202010007565 | U1 | 9/2010 | |
| DE | 202014106139 | U1 | 1/2015 | |
| KR | 20110093603 | A | 8/2011 | |
| WO | WO-2014094792 | A1 * | 6/2014 | ............ F03D 13/10 |
| WO | 2018/133964 | A1 | 7/2018 | |

OTHER PUBLICATIONS

The First Chinese Office Action dated Jun. 2, 2022; Appln. No. 202010342220.8.
The Extended European Search Report dated Aug. 16, 2023; Appln. No. 20933319.4.
The International Search Report mailed Jan. 27, 2021; PCT/CN2020/115037.

* cited by examiner

SUPPORT DEVICE AND WIND GENERATING SET

CROSS-REFERENCE TO RELATED APPLICATIONS

The present application is a National Phase entry of PCT Application No. PCT/CN2020/115037, filed on Sep. 14, 2020, which claims the priority to Chinese Patent Application No. 202010342220.8, titled "SUPPORT DEVICE AND WIND TURBINE", filed on Apr. 27, 2020, which are incorporated herein by reference in their entireties.

FIELD

The present application relates to the technical field of wind power, and in particular to a support device and a wind turbine.

BACKGROUND

A converter cabinet, a main control cabinet, a water-cooling cabinet, a switch cabinet, a fire hydrant cabinet and other electrical equipment are enclosed in the tower of the wind turbine. These equipment need to be placed inside the tower and at a certain height from the ground, which, on the one hand, facilitates the cabling of these cabinets, and on the other hand, avoids the equipment from being immersed when water enters the tower. Therefore, the electrical equipment needs the support device to support.

In the construction of wind power projects, situation that needs to add equipment or needs to change the tower model in the later stage according to the special circumstances of the project often occur. Especially for the case of adding equipment in the later stage, the support device needs to be retrofitted according to the existing conditions, for example, changing the dimension of the support device. Due to the unreasonable structural design of the existing support device, it is difficult to retrofit the support device according to the project requirements, which adversely affects versatility of the support device.

Therefore, there is an urgent need for a new support device and a wind turbine.

SUMMARY

A support device and a wind turbine are provided according to the embodiments of the present application. The support device is configured to support electrical equipment of the wind turbine, and the dimension and/or load-bearing capacity of the support device can be adjusted according to the requirements of the equipment, so the support device has better versatility.

In one aspect, a support device for a wind turbine is provided according to the embodiments of the present application. The wind turbine includes electrical equipment, and the support device includes a support frame and a support platform. The support frame has a hollow frame structure and includes multiple beam members, adjacent beam members are connected to each other, and the relative position between at least one group of two beam members connected to each other is adjustable. The support platform is arranged on a surface of the support frame in a height direction of the support frame and connected with the beam members, and the support platform is configured to support the electrical equipment.

In an embodiment according to one aspect of the present application, the support device further includes a first connecting member, and at least two beam members intersect with each other and are connected by the first connecting member, and the relative position between the first connecting member and at least one beam member is adjustable, and the first connecting member is detachably connected with the at least one beam member.

In any one of the foregoing embodiments according to one aspect of the present application, the beam member defines a first sliding groove, and the first connecting member includes a first extension portion and a second extension portion which intersect with each other. The first extension portion is snapped in a first sliding groove of one of the two intersecting beam members, and the first extension portion is in sliding fit with the first sliding groove. The second extension portion is snapped in a first sliding groove of the other of the two intersecting beam members, and the second extension portion is in sliding fit with the corresponding first sliding groove. The support device further includes a first fastener, the first extension portion is provided with the first fastener, and/or, the second extension portion is provided with the first fastener, so as to lock the relative position between the first connecting member and the corresponding beam member.

In any one of the foregoing embodiments according to one aspect of the present application, the support device further includes a second connecting member, at least two beam members extend in a same direction and are arranged in sequence in the extension direction, and the two beam members that extend in the same direction and are arranged in sequence in the extension direction are connected to each other by the second connecting member, wherein the relative position between the second connecting member and the at least one beam member is adjustable and the second connecting member is detachably connected with the at least one beam member.

In any one of the foregoing embodiments according to one aspect of the present application, the beam member defines the first sliding groove, the second connecting member is of a strip shape and includes a first connecting end and a second connecting end that are oppositely arranged, the first connecting end is inserted in the first sliding groove of one of the two beam members that extend in the same direction and are arranged in sequence in the extension direction and the first connecting end is in sliding fit with the first sliding groove, and the second connecting end is inserted in the first sliding groove of the other of the two beam members that extend in the same direction and are arranged in sequence in the extension direction and the second connecting end is in sliding fit with the corresponding first sliding groove. The support device further includes a second fastener, the first connecting end is provided with the second fastener, and/or, the second connecting end is provided with the second fastener, so as to lock the relative position between the second connecting member and the beam member.

In any one of the foregoing embodiments according to one aspect of the present application, the beam member is of a prismatic shape, at least one side wall surface of the beam member defines the first sliding groove recessed inwards, and the first sliding groove penetrates through the beam member in the extension direction.

In any one of the foregoing embodiments according to one aspect of the present application, the beam member is made of a first material, and the first material includes at least one of aluminum alloy, magnesium aluminum alloy, titanium alloy, aluminum silicon alloy, aluminum copper alloy, and aluminum zinc alloy.

In any one of the foregoing embodiments according to one aspect of the present application, the beam member has a profile structure and has at least one cavity inside, and a projection of the side wall defining the cavity in the extension direction of the beam member is a polygon or a honeycomb shape.

In any one of the foregoing embodiments according to one aspect of the present application, the support platform includes a body portion and a surrounding plate arranged around the body portion, and the surrounding plate is movably connected with the body portion, so that the dimension of the outer edge of the support platform is adjustable.

In any one of the foregoing embodiments according to one aspect of the present application, the body portion includes a support plate and an enclosing part wrapping the outer periphery of the support plate. The enclosing part has a horizontal extension portion and a vertical installation portion stacked above the horizontal extension portion in the height direction. The vertical installation portion defines an adjustment groove, and the surrounding plate is inserted into the adjustment groove and is in clearance fit with the adjustment groove. In the height direction, at least part of the surrounding plate overlaps with and is detachably connected with the body portion.

In any one of the foregoing embodiments according to one aspect of the present application, the surrounding plate includes a pressing portion and an adjustment portion that are intersected and connected with each other, the adjustment portion is arranged around the body portion, and the adjustment portion is inserted into the adjustment groove and is detachably connected with the body portion, and/or, the surrounding plate includes multiple arc-shaped units, and the multiple arc-shaped units are sequentially arranged along the outer edge of the body portion, and the relative position between each arc-shaped unit and the body portion is adjustable.

In any one of the foregoing embodiments according to one aspect of the present application, the beam member at least connected to the support platform, among the multiple beam members, further includes a second sliding groove, and the support device further includes a third connecting member and a third fastener. The third connecting member includes a first snapping end and a second snapping end that are sequentially arranged. At least part of the first snapping end extends in the second sliding groove and engages with the side wall defining the second sliding groove. The second snapping end abuts against the support platform and is detachably connected to the support platform through the third fastener.

In any one of the foregoing embodiments according to one aspect of the present application, the support device further includes a height adjusting member which is arranged on one side of the support frame away from the support platform and connected to at least part of the beam members to adjust the height of the support platform.

In any one of the foregoing embodiments according to one aspect of the present application, the support device further includes a flip cover plate, the support platform defines at least one notch, and the flip cover plate is movably connected in at least one notch.

In any one of the foregoing embodiments according to one aspect of the present application, the support device further includes a bridge frame, which is movably connected to at least one beam member.

In any one of the foregoing embodiments according to one aspect of the present application, the support device further includes a reinforcing support member which is connected between the support frame and the support platform.

In any one of the foregoing embodiments according to one aspect of the present application, the support device further includes an installation port, and the installation port is movably connected with at least one beam member.

In another aspect, a wind turbine is provided according to the embodiments of the present application, which includes a tower, the tower includes a tower body and an accommodation space defined by the tower body; a support device, the support device is arranged in the accommodation space; and electrical equipment, the electrical equipment is installed on the support platform of the support device.

According to the support device and the wind turbine provided by the embodiments of the present application, the support device includes the support frame and the support platform, the support platform is configured to support and place the electrical equipment, and the support frame is configured to support the support platform and the electrical equipment thereon at a predetermined height. Besides, since the support frame has a hollow frame structure and includes multiple beam members and the relative position between at least one group of two beam members connected to each other is adjustable, the dimension and/or load-bearing capacity of the support frame is adjustable, that is, the dimension and/or load-bearing capacity of the support frame can be adjusted by adjusting the relative position between the beam members connected to each other according to the project requirements, thereby improving the overall versatility of the support device.

BRIEF DESCRIPTION OF THE DRAWINGS

Features, advantages, and technical effects of exemplary embodiments of the present application will be described below with reference to the accompanying drawings.

Figure 1:
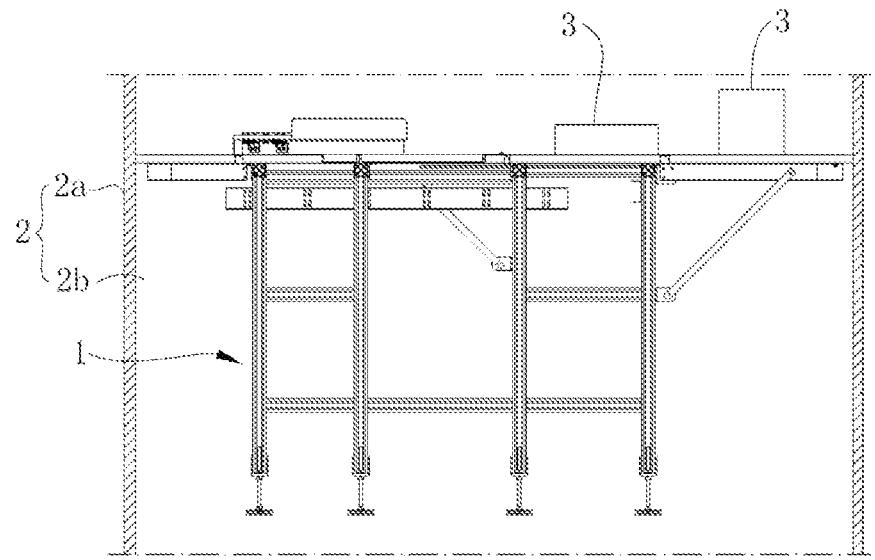
FIG. 1 is a structural view of part of a wind turbine according to an embodiment of the present application.

| Reference numerals in the drawings: | |
|---|---|
| 1 support device; | 10 support frame; |
| 11 beam member; | 111 first sliding groove; |
| 112 cavity; | 113 second sliding groove; |
| 114 third position-limiting protrusion; | 20 support platform; |
| 21 body portion; | 211 support plate; |
| 212 enclosing part; | 212a horizontal extension portion; |
| 212b vertical installation portion; | 212c adjustment groove; |
| 2121 arc-shaped unit; | 22 surrounding plate; |
| 221 pressing portion; | 222 adjustment portion; |
| 23 notch; | 30 first connecting member; |
| 31 first extension portion; | 311 first opening; |
| 32 second extension portion; | 321 second opening; |
| 33 first position-limiting protrusion; | 40 first fastener; |
| 50 second connecting member; | 51 first connecting end; |
| 511 third opening; | 52 second connecting end; |
| 521 fourth opening; | 53 second position-limiting protrusion; |
| 60 second fastener; | 70 third connecting member; |
| 71 first snapping end; | 72 second snapping end; |
| 80 third fastener; | 90 height adjusting member; |

| -continued | |
|---|---|
| Reference numerals in the drawings: | |
| 91 adjustment screw rod; | 92 connecting block; |
| 93 position-limiting nut; | 100 flip cover plate; |
| 110 bridge frame; | 120 reinforcing support member; |
| 130 installation port; | |
| 2 tower; | 2a tower body; |
| 2b accommodation space; | |
| 3 electrical equipment; | X horizontal extension direction; |
| Y height direction; | M extension direction. |

In the drawings, same components are denoted by the same reference numerals. The drawings are not drawn to actual scale.

DETAILED DESCRIPTION OF THE EMBODIMENTS

Characteristics and exemplary embodiments of the present application are described in detail hereafter. Specific details are provided in the following description for a thorough understanding of the present application. It should be obvious to those skilled in the art that the present application can be implemented without some of the specific details. The description of the exemplary embodiments is only intended to provide a better understanding of the present application. In the drawings and the following description, at least part of well-known structures and techniques are omitted to avoid unnecessarily obscuring the present application. The dimensions of part of the structures may be enlarged for a clear illustration. Furthermore, the described features, structures, or characteristics may be combined in any suitable manner in one or more embodiments.

All the orientation words appearing in the following description are the directions shown in the drawings and are not intended to limit the specific structures of the support device and the wind turbine of the present application. In a description of the present application, it should be further noted that, unless otherwise explicitly specified and defined, terms such as "installation" and "connection" should be understood in a broad sense, for example, the terms may imply a fixed connection, a detachable connection, or an integral connection; a direct connection or an indirect connection. For the person skilled in the art, the terms in the present application should be explained in the light of specific situation.

In order to better understand the present application, the support device and the wind turbine according to the embodiments of the present application are described in detail below with reference to FIGS. 1 to 26.

Referring to FIG. 1, a wind turbine according to an embodiment of the present application includes a tower 2, a support device 1, and electrical equipment 3. The tower 2 includes a tower body 2a and an accommodation space 2b defined by the tower body 2a. The support device 1 is arranged in the accommodation space 2b, and the electrical equipment 3 is mounted on the support device 1. The electrical equipment 3 is supported at a certain height from the ground by the support device 1, which not only facilitates the cabling of the electrical equipment 3, but also avoids the electrical equipment 3 from being immersed when water enters the tower 2 and further affecting the safety performance of the wind turbine.

Optionally, the electrical equipment 3 may be at least one of the following: a converter cabinet, a main control cabinet, a water-cooling cabinet, a switch cabinet, and a fire hydrant cabinet. The number of electrical equipment 3 may be determined according to the power generation requirements of the wind turbine, which is not limited herein.

In a case that the dimension of the tower 2 or the number or weight of the electrical equipment 3 need to be changed, an existing support device cannot adapt to the above parameter changes according to the engineering requirements, resulting in poor versatility of the support device 1, which adversely affects the power generation efficiency of the wind turbine.

Therefore, a new type of support device 1 is further provided according to the embodiments of the present application, which can be produced and sold separately as an independent component. Of course, the support device can be used in the wind turbine according to the above embodiments and used as a component of the wind turbine. In order to better understand the support device 1 according to the embodiments of the present application, the support device 1 according to the embodiments of the present application is described in detail below with reference to FIGS. 2 to 26.

Figure 2:
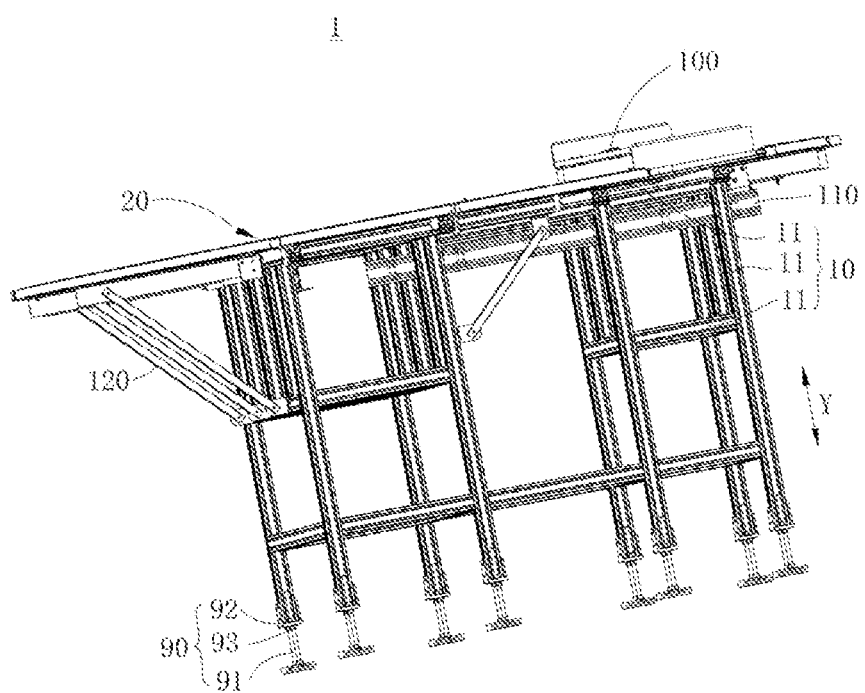
FIG. 2 is a perspective view of a support device according to an embodiment of the present application.
Figure 3:
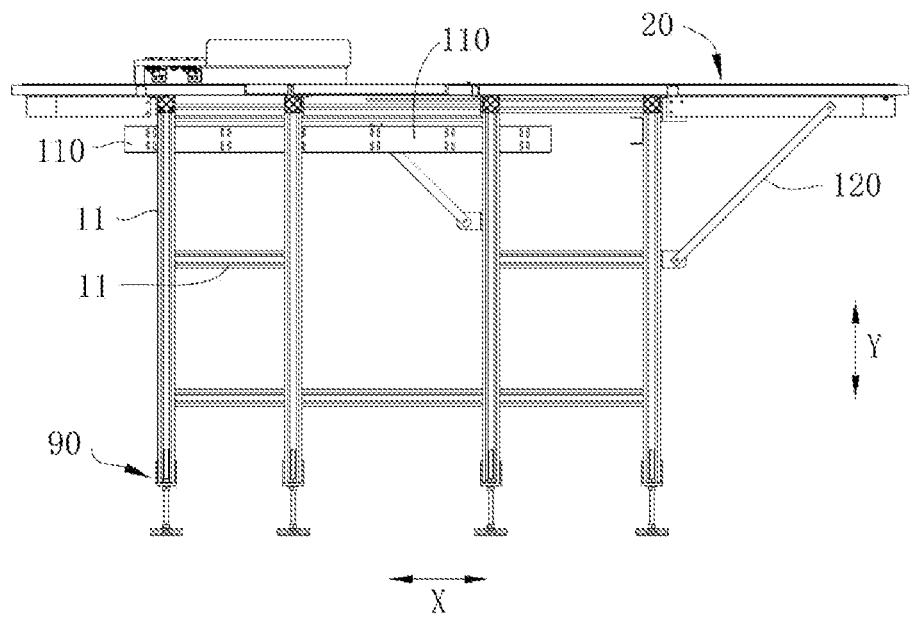
FIG. 3 is a front view of the support device according to an embodiment of the present application.
Figure 4:
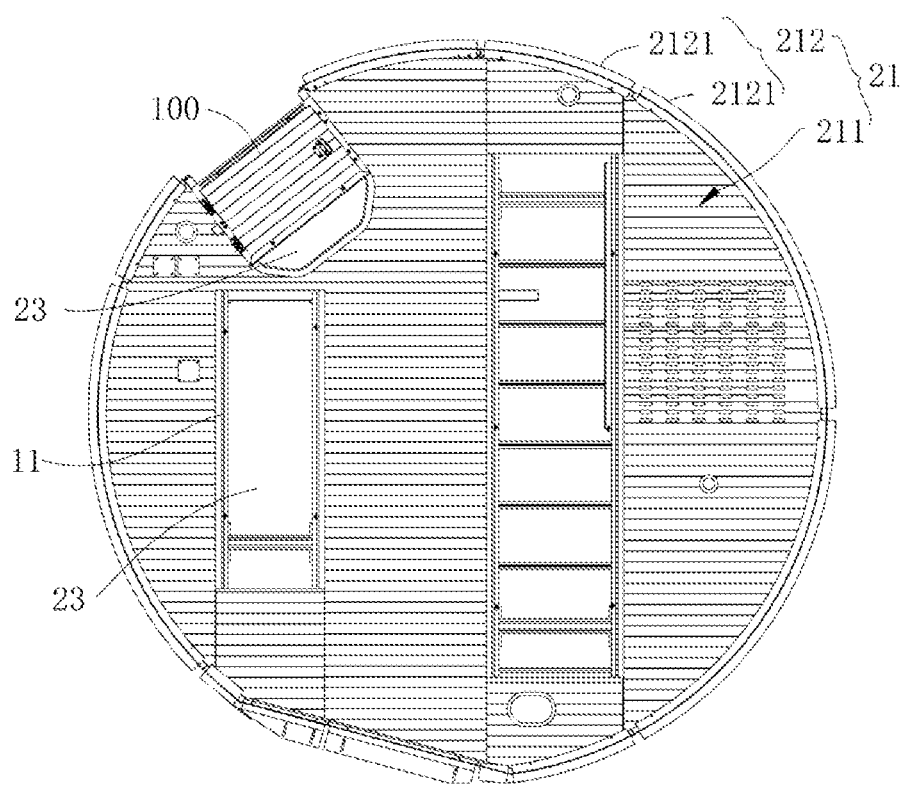
FIG. 4 is a top view of the support device according to an embodiment of the present application.

Referring to FIGS. 2 to 4, a support device 1 is provided according to the embodiments of the present application, which includes a support frame 10 and a support platform 20. The support frame 10 has a hollow frame structure and includes multiple beam members 11, adjacent beam members 11 are connected to each other, and the relative position between at least one group of two beam members 11 connected to each other is adjustable. The support platform 20 is arranged on a surface of the support frame 10 in a height direction Y of the support frame and connected with the beam members 11, and the support platform 20 is configured to support the electrical equipment 3.

In the support device 1 according to the embodiments of the present application, the relative position between at least one group of two beam members 11 connected to each other of the support frame 10 is adjustable, so that the dimension and/or load-bearing capacity of the support frame 10 can be adjusted by adjusting the relative position between the beam members 11 connected to each other, thereby improving the overall versatility of the support device 1.

Optionally, the dimension of the support device 1 can be adjusted by adjusting the relative distance between two beam members 11 connected to each other, so that the support device 1 can be adapted to different situations, for example, the tower 2 has a different radial dimension or the electrical equipment 3 is required to be located further from the ground.

Of course, in some embodiments, at least local strength of the support device 1 can be adjusted by adjusting the connection position between two beam members 11 connected to each other, thereby changing the load-bearing capacity of the corresponding position.

Optionally, in the support device 1 according to the above embodiments, the number of beam members 11 included in the support frame 10 is not limited to specific numerical values, and the lengths and extension directions of the multiple beam members 11 may be different. For example, some of the multiple beam members 11 are arranged along the height direction Y of the support frame 20, at least part of the beam members 11 are arranged along the horizontal extension direction X of the support platform 10, and the beam members 11 arranged in the horizontal extension direction X are intersected and connected with the beam members 11 arranged in the height direction Y.

Figure 5:
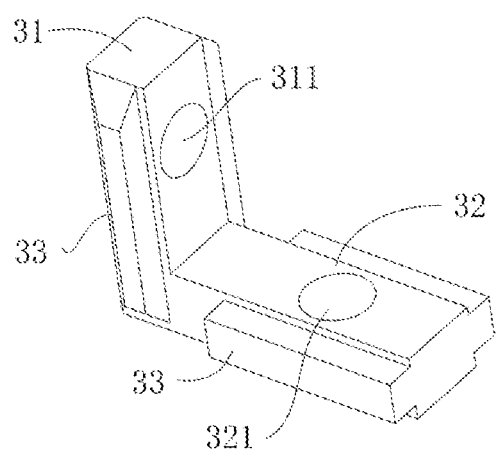
FIG. 5 is a schematic structural view of a first connecting member according to an embodiment of the present application.
Figure 6:
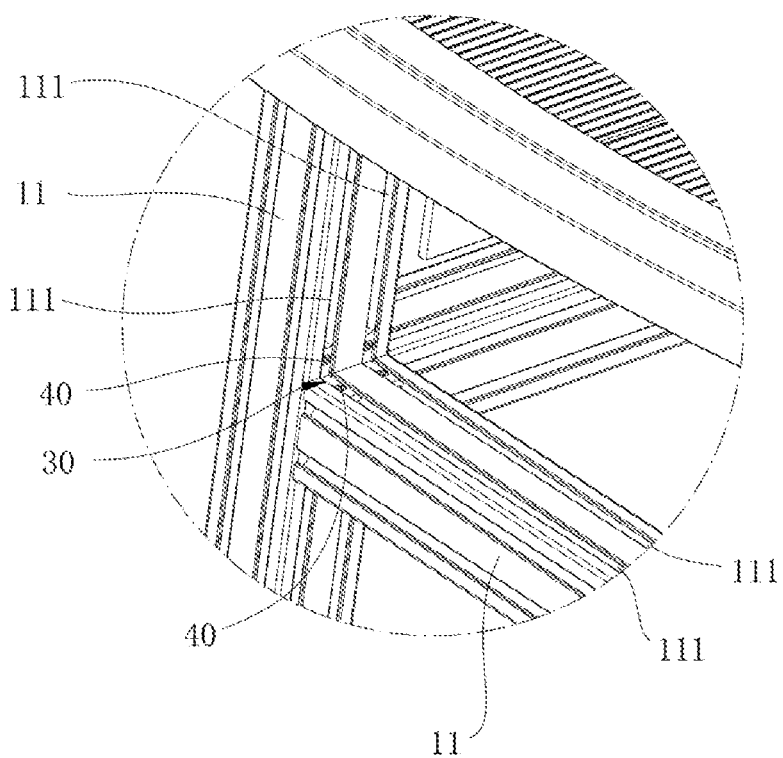
FIG. 6 is a partial enlarged view of the support device according to an embodiment of the present application.

Referring to FIGS. 5 and 6, as an alternative embodiment, the support device 1 according to the above embodiments further includes a first connecting member 30, and at least two beam members 11 are intersected and connected with each other through the first connecting member 30. The relative position between the first connecting member 30 and at least one beam member 11 is adjustable, and the first connecting member is detachably connected with the at least one beam member. By providing the first connecting member 30, two beam members 11 intersected and connected with each other may be connected to each other through the first connecting member 30, so as to ensure the stability of the support frame 10. In addition, by limiting that the relative position between the first connecting member 30 and at least one beam member 11 is adjustable and the first connecting member is detachably connected with the at least one beam member, the position adjustment between the two beam members 11 connected to each other and the assembly requirements can be facilitated.

In some optional embodiments, in the support device 1 according to the above embodiments, the beam member 11 defines a first sliding groove 111, and the first connecting member 30 includes a first extension portion 31 and a second extension portion 32 which intersect with each other. The first extension portion 31 is snapped in a first sliding groove 111 of one of the two intersecting beam members 11, and the first extension portion 31 is in sliding fit with the first sliding groove. The second extension portion 32 is snapped in a first sliding groove of the other of the two intersecting beam members 11, and the second extension portion 32 is in sliding fit with the corresponding first sliding groove. The support device 1 further includes a first fastener 40, and the first extension portion 31 is provided with the first fastener 40. Through the above arrangement, the form of the first connecting member 30 can be simplified, and the connection between the two beam members 11 intersected and connected with each other can be facilitated. Moreover, when the distance between the two intersecting beam members 11 needs to be adjusted, the first extension portion 31 can be unlocked by screwing the first fastener 40, so that the first extension portion 31 can move along the first sliding groove 111 of the beam member 11 cooperating with the first extension portion, which in turn drives the beam member 11 connected to the second extension portion 32 to move, so as to change the connection position between the two intersecting beam members 11 and adjust the local strength of the support frame 10.

Optionally, in the support device 1 according to the embodiments of the present application, the first fastener 40 is provided on the second extension portion 32 to lock the relative position between the first connecting member 30 and the beam member 11. Through the above arrangement, the two beam members 11 connected to each other can be more stable after position adjustment, thereby improving the safety performance of the support device 1.

As an alternative embodiment, the first extension portion 31 may be of a strip structure, and be provided with a first opening 311 that matches the shape of the first fastener 40 and cooperates with the first fastener. Optionally, the second extension portion 32 may be of a strip structure and be provided with a second opening 321 that matches the shape of the first fastener 40 and cooperates with the first fastener, so as to facilitate the locking and unlocking requirements of the relative position with the corresponding beam member 11.

Optionally, the first extension portion 31 and the second extension portion 32 may be perpendicular to each other, which can facilitate the connection and position adjustment between the two intersecting beam members 11 and can optimize the overall strength of the support device 1.

Optionally, each of the first extension portion 31 and the second extension portion 32 may be provided with a first position-limiting protrusion 33, so that the first extension portion 31 cannot be detached from the first sliding groove 111 in a direction intersecting with the extension direction or the length direction of the beam member 11 connected with the first extension portion, and the second extension portion 32 cannot be detached in a direction intersecting with the extension direction or the length direction of the beam member 11 connected with the second extension portion.

In the support device 1 according to the embodiments of the present application, at least two beam members 1111 are intersected and connected with each other through the first connecting member 30, so that the connection position between the two beam members 11 can be adjusted by the first connecting member 30. One beam member 11 can be moved to any position of the other beam member 11 through the first connecting member 30. For example, when the support device 1 requires a higher load-bearing capacity at some positions, multiple beam members 11 can be moved to these positions, so the beam members 11 at these positions become denser and the load-bearing capacity here is further improved. Moreover, the intersecting beam members 11 are connected in this way, so that when the support device 1 is applied to a wind turbine, the positions of the beam members 11 can be adjusted to avoid other components such as wiring, thus the support device 1 can be used flexibly.

Referring to FIGS. 7 to 10, in some optional embodiments, the support device 1 according to the embodiments of the present application further includes a second connecting member 50, at least two beam members 11 of the multiple beam members 11 of the support frame 10 extend in a same direction and are arranged in sequence in the extension direction, and the two beam members 11 that extend in the same direction and are arranged in sequence in the extension direction are connected to each other by the second connecting member 50, and, the relative position between the second connecting member 50 and the at least one beam member 11 is adjustable and the second connecting member is detachably connected with the at least one beam member. Through the above arrangement, the dimension of the support device 1 can be adjusted by adjusting the relative distance between two beam members connected to each other, so that the support device 1 can be adapted to different situations, for example, the tower 2 has a different radial dimension or the electrical cabinet is required to be located further from the ground.

Figure 7:
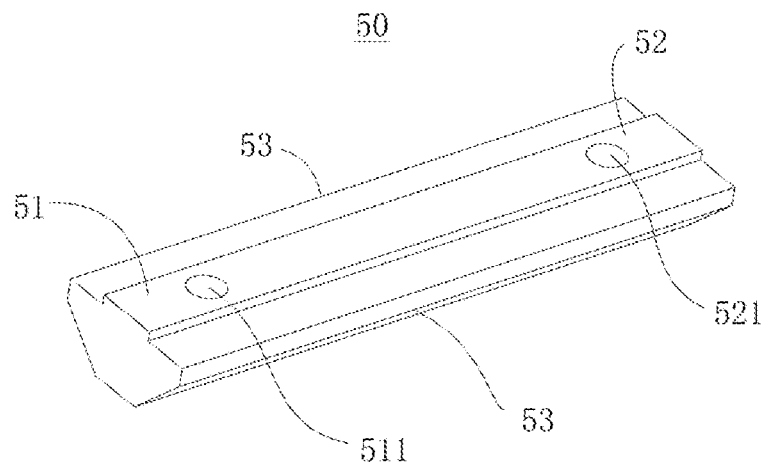
FIG. 7 is a schematic structural view of a second connecting member according to an embodiment of the present application.
Figure 8:
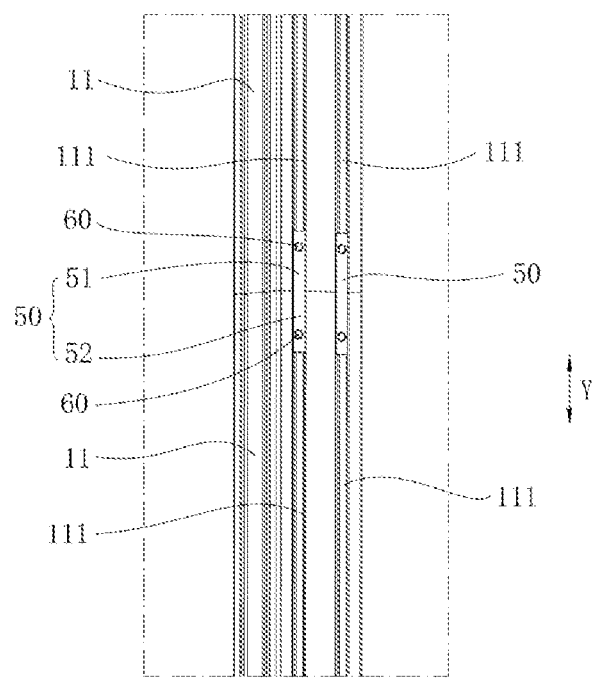
FIG. 8 is a state view of beam members extending in a same direction and connected to each other according to an embodiment of the present application.
Figure 9:
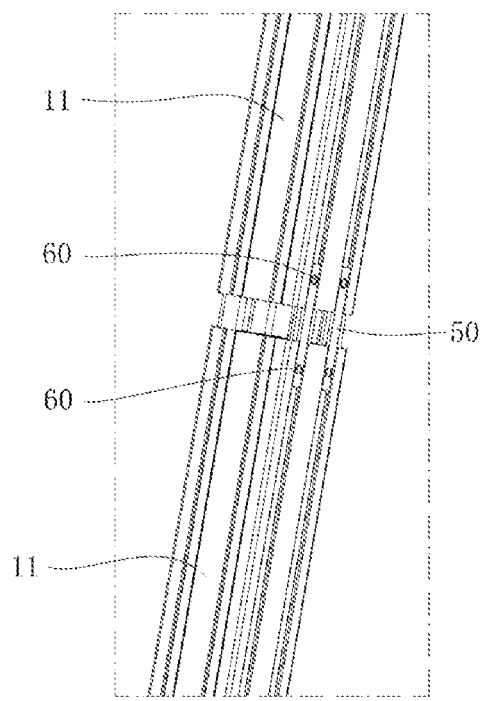
FIG. 9 is another state view of the beam members extending in the same direction and connected to each other according to an embodiment of the present application.

For example, as shown in FIGS. 7 and 8, two beam members 11 extending in the height direction Y and arranged in sequence are connected to each other by the second connecting member 50, and the distance between the two beam members 11 extending in the height direction Y can be increased by adjusting the relative position between the second connecting member 50 and one or two of the beam members 11, so that the overall dimension of the two beam members 11 and the second connecting member 50 connecting the two beam members becomes longer in the height direction Y, which meets the requirement of adjusting the overall height of the support device 1.

Of course, when the height value required to be increased in the height direction Y is greater, since the second connecting member 50 is detachably connected to the beam member 11, the second connecting member 50 may be detached and separated from one of the beam members 11, and then another beam member 11 with a predetermined required length and another second connecting member 50 may be added between the two beam members 11 extending in the height direction Y, both ends of the additional beam member 11 are connected to the initial beam members 11 of the support device 1 through the second connecting member 50, which can also increase the height of the support device 1 in the height direction Y.

That is, when the dimension to be adjusted is in a small degree, the dimension to be adjusted can be realized by adjusting the relative position between the second connecting member 50 and the beam member 11, that is, by adjusting the dimension of the second connecting member 50 extending out of the beam member 11. When the dimension to be adjusted is in a large degree, the dimension to be adjusted can be realized by increasing the number of the beam members 11 and connecting these newly added beam members to the initial beam members 11 through the second connecting member 50, thereby improving the versatility of the support device 1.

It is conceivable that, in the above embodiments, the two beam members 11 extending in the height direction Y are connected by the second connecting member 50. Of course, in some other embodiments, the two beam members 11 extending in the horizontal extension direction X may be connected by the second connecting member 50, so that the size of the support frame 10 in the horizontal extension direction X is adjustable. The principle is the same as the above, which will not be repeated again.

Referring to FIGS. 7 to 10, as an alternative embodiment, in the support device 1 according to the above embodiments, the beam member 11 defines the first sliding groove 111, the second connecting member 50 is of a strip shape and includes a first connecting end 51 and a second connecting end 52 that are oppositely arranged, the first connecting end 51 is inserted in the first sliding groove 111 of one of the two beam members 11 that extend in the same direction and are arranged in sequence in the extension direction and the first connecting end is in sliding fit with the first sliding groove, and the second connecting end 52 is inserted in the first sliding groove 111 of the other of the two beam members 11 that extend in the same direction and are arranged in sequence in the extension direction and the second connecting end is in sliding fit with the corresponding first sliding groove. The support device 1 further includes a second fastener 60, the first connecting end 51 is provided with the second fastener 60, and/or, the second connecting end 52 is provided with the second fastener 60, so as to lock the relative position between the second connecting member 50 and the beam member 11. Similarly, through the above arrangement, the form of the second connecting member 50 can be simplified, and the connection between the two beam members 11 extending in the same direction and arranged in sequence can be facilitated.

Moreover, when the distance between the two beam members 11 extending in the same direction and connected to each other needs to be adjusted, the first connecting end 51 can move along the first sliding groove 111 of the beam member 11 cooperating with the first connecting end by screwing the second fastener 60, and the second connecting end 52 can move along the first sliding groove 111 of the corresponding beam member 11 cooperating with the second connecting end, so as to change the distance between the two beam members 11 extending in the same direction. Furthermore, the dimension of the support frame 10 in the height direction Y or the horizontal extension direction X can be better adjusted.

Optionally, the second connecting member 50 may be of a strip-shaped structure, the first connecting end 51 defines a third opening 511 that matches the shape of the second fastener 60 and cooperates with the second fastener, and the second connecting end 52 defines a fourth opening 521 that matches the shape of the second fastener 60 and cooperates with the second fastener, so as to facilitate the locking and unlocking requirements of the relative position with the corresponding beam member 11.

Optionally, the first connecting end 51 and/or the second connecting end 52 is provided with a second position-limiting protrusion 53, so that the second connecting member 50 cannot be detached from the first sliding groove 111 of the beam member 11 in a direction intersecting with the extension direction or the length direction of the beam member 11 connected with the second connecting member, thereby guaranteeing the safety of the support device 1.

Figure 10:
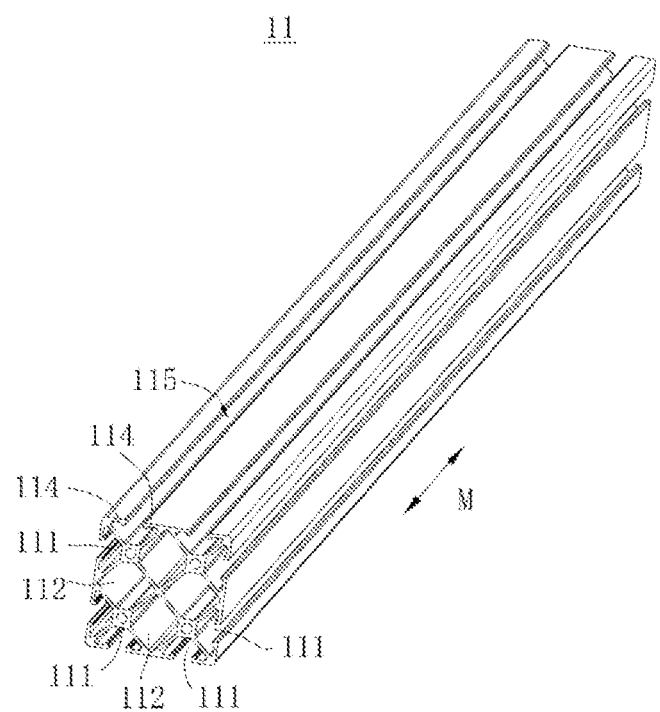
FIG. 10 is a schematic structural view of the beam member according to an embodiment of the present application.
Figure 11:
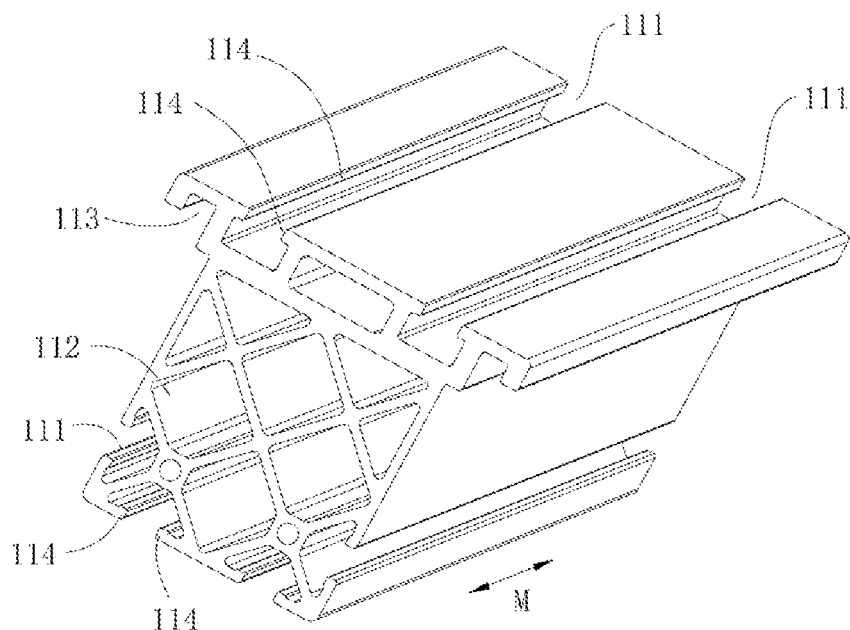
FIG. 11 is a schematic structural view of the beam member according to another embodiment of the present application.

Referring to FIG. 10, in some optional embodiments, in the support device 1 according to the above embodiments, the beam member 11 is of a prism shape, at least one side wall of the beam member 11 defines the first sliding groove 111 recessed inwards, and the first sliding groove 111 penetrates through the beam member 11 in the extension direction M or the length direction. Through the above arrangement, the disassembly and assembly of the first connecting member 30 and the second connecting member 50 can be facilitated, so that the first connecting member 30 and the second connecting member 50 can be inserted or slide into the first sliding groove 111 of the corresponding beam member 11 along the extension direction M of the beam member 11 with which the connecting members cooperate, which can not only facilitate the overall forming of the support frame 10, but also facilitate the adjustment of the dimension and/or load-bearing capacity of the support frame 10.

Optionally, one first sliding groove 111 of the beam member 11 may be provided. Of course, in some other embodiments, multiple first sliding grooves 111 may be provided. Moreover, the number of the first sliding groove 111 on each wall surface of the beam member 11 may be one or more, which can be specifically determined based on the number of the connected first connecting members 30 and/or the connected second connecting members 50, as long as the provided first sliding grooves can meet the connection requirements and position adjustment requirements of the beam members 11 of the support frame 10.

Since the first sliding groove 111 is formed by recessing the side wall surface of the beam member 11 toward the inside of the beam member 11, the first sliding groove 111 is through in the extension direction X of the beam member 11 and penetrates through the side wall of the beam member 11 to form a socket 115 to facilitate the installation of the first connecting member 30 and the second connecting member 50, facilitate the insertion, locking and unlocking of the first connecting member 30 by the first fastener 40, and facilitate the insertion, locking and unlocking of the second connecting member 50 by the second fastener 60.

Furthermore, due to the above-mentioned structural form of the first sliding groove, there is no need to connect the beam members 11 by welding, which can reduce pollution and prevent the beam members 11 from deformation by welding, and further guarantee the supporting strength of the support device 1.

Optionally, in order to restrict the first connecting member 30 and the second connecting member 50 from separating from the beam member 11 with which the connecting members cooperate in a direction intersecting with the extension direction X of the beam member 11, a side wall surface of the beam member 11 may be provided with a third position-limiting protrusion 114 extending into the socket 115 formed by the first sliding groove 111. The first connecting member 30 and the second connecting member 50 can be prevented from detaching in a direction intersecting with the extension direction of the beam member 11 through the cooperation of the third position-limiting protrusion 114 and the first connecting member 30 and the second connecting member 50.

Optionally, in a case that the first connecting member 30 includes the first position-limiting protrusion 33, the third position-limiting protrusion 114 may be configured to cooperate with the first position-limiting protrusion 33, so as to restrict the first connecting member 30 from detaching from the beam member 11 as a whole in a direction intersecting with the extension direction of the beam member 11 where the first connecting member is located. Similarly, in a case that the second connecting member 50 includes the second position-limiting protrusion 53, the third position-limiting protrusion 114 may be configured to cooperate with the second position-limiting protrusion 53, so as to restrict the second connecting member 50 from detaching from the beam member 11 as a whole in a direction intersecting with the extension direction of the beam member 11 where the second connecting member is located.

As an alternative embodiment, in the support device 1 according to the above embodiments, the beam member 11 is made of a first material, and the first material includes at least one of aluminum alloy, magnesium aluminum alloy, titanium alloy, aluminum silicon alloy, aluminum copper alloy, and aluminum zinc alloy. Through the above arrangement, the weight of the support device 1 can be further reduced, making the support device light and easy to install. The forming efficiency of the support device 1 is effectively improved. Moreover, since the beam member 11 is made of the above-mentioned materials, the oxide film formed by the beam member 11 itself can still ensure good anti-corrosion performance, and there is no need to perform anti-corrosion treatment. The beam member is suitable for use in various harsh climate environments, and has no pollution to the environment, and meets the requirements of environmental protection policies.

In some optional embodiments, in the support device 1 according to the above embodiments, the beam member 11 has a profile structure, which is low in cost and easy to form, and more importantly, realizes generalization and standardization. After the structure is determined, the beam member can be designed as a versatile structure and can be mass-produced. The structure of the beam member 11 will not change due to the change of the diameter of the tower 2, which is beneficial to production and will not cause material waste.

As an optional embodiment, in the support device 1 according to the above embodiments, the beam member 11 has at least one cavity 112 inside, the weight of the support device 1 can be further ensured by providing the cavity 112 inside the beam member 11 on the basis of guaranteeing the overall strength of the formed support device 1, and the cost can be saved.

Optionally, a projection of the side wall defining the cavity 112 in the extension direction of the beam member 11 is like a polygon, for example, a regular quadrilateral such as a rhombus and the like, which apparently is an optional way. The projection is not limited to the above shape, and the shape is applicable as long as the strength of the beam member 11 can be guaranteed.

Figure 12:
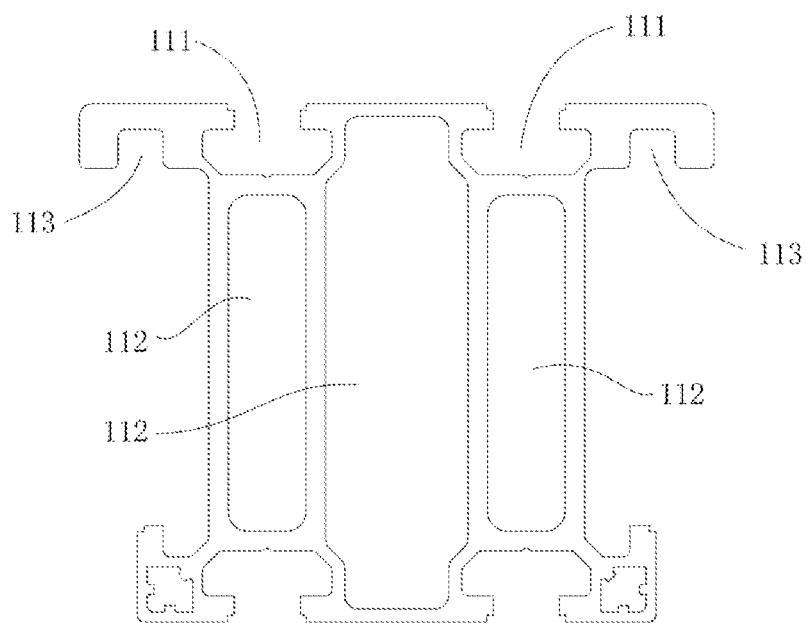
FIG. 12 is a schematic structural view of the beam member according to another embodiment of the present application.
Figure 13:
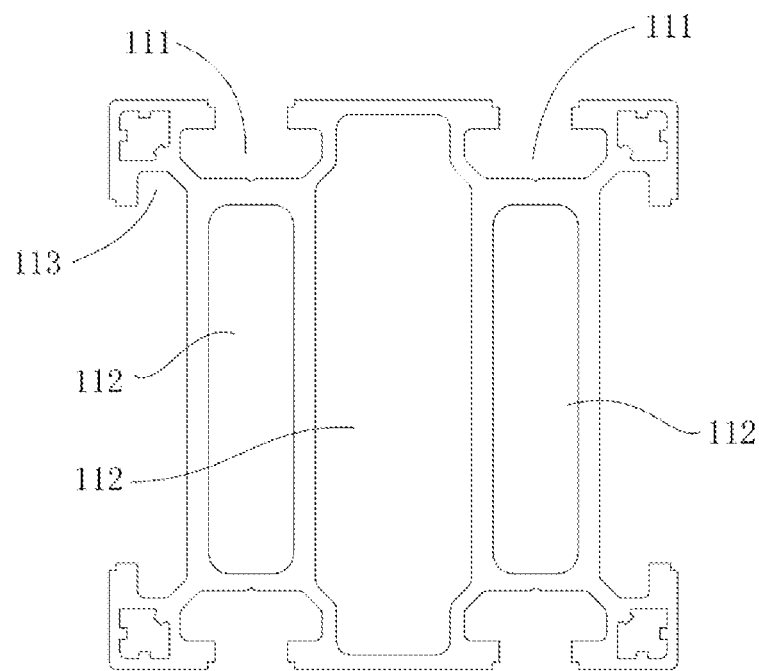
FIG. 13 is a schematic structural view of the beam member according to another embodiment of the present application.
Figure 14:
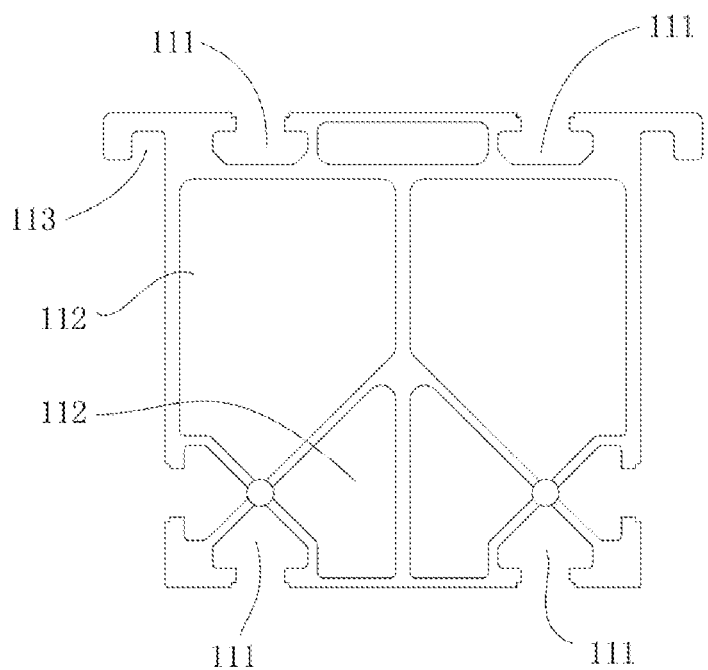
FIG. 14 is a schematic structural view of the beam member according to another embodiment of the present application.
Figure 15:
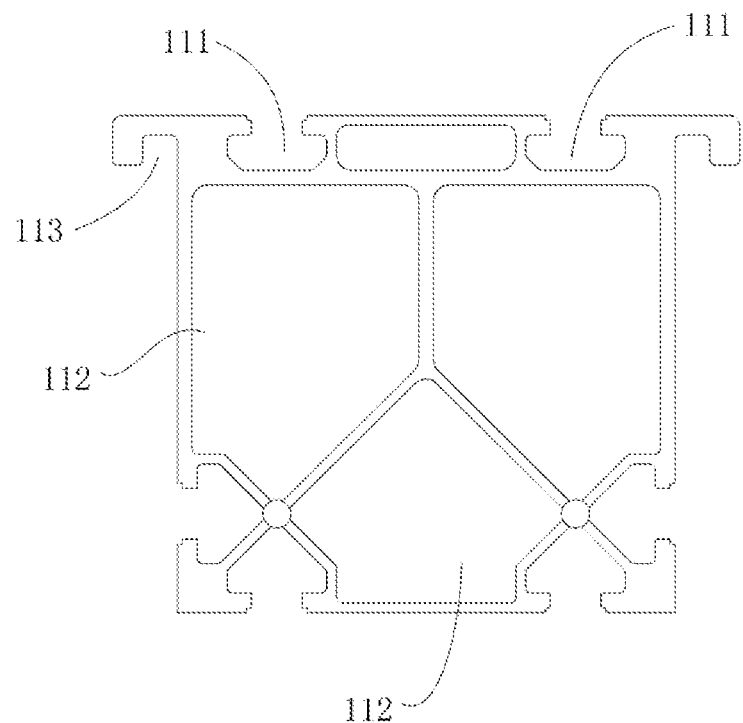
FIG. 15 is a schematic structural view of the beam member according to another embodiment of the present application.
Figure 16:
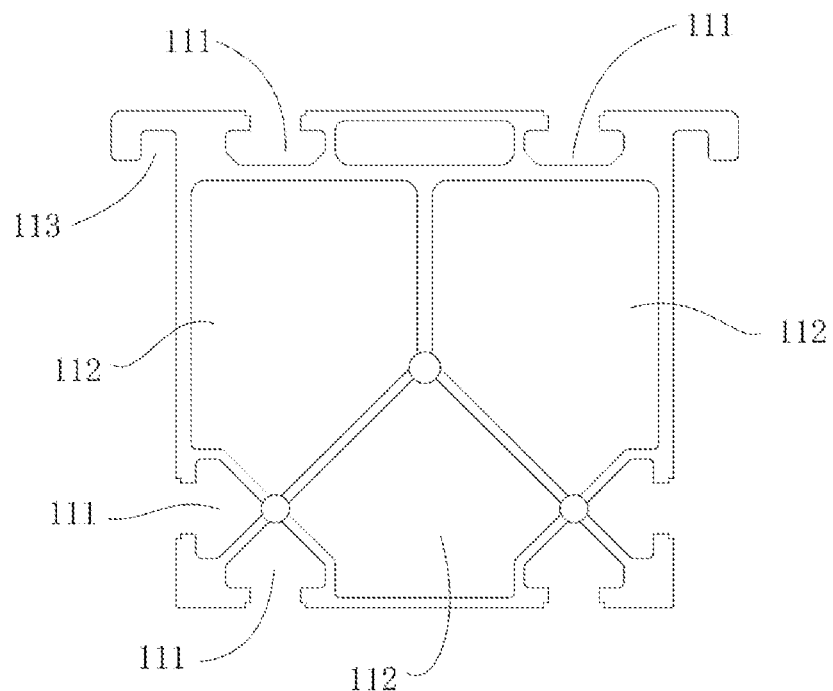
FIG. 16 is a schematic structural view of the beam member according to another embodiment of the present application.
Figure 17:
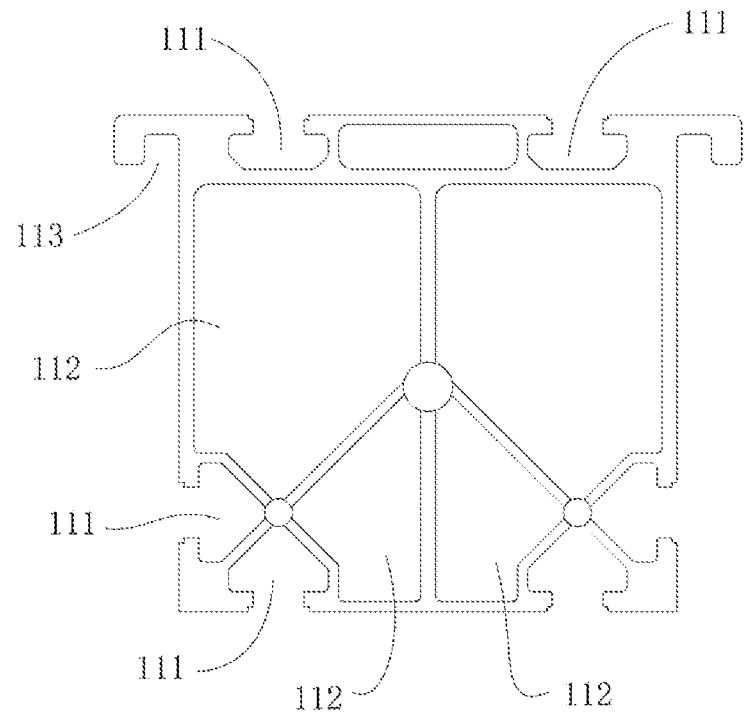
FIG. 17 is a schematic structural view of the beam member according to another embodiment of the present application.
Figure 18:
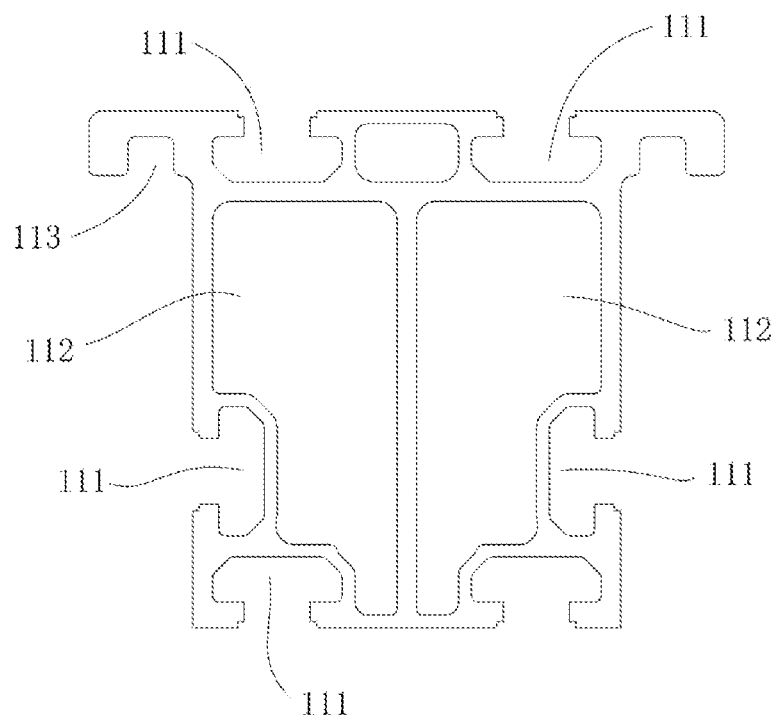
FIG. 18 is a schematic structural view of the beam member according to another embodiment of the present application.
Figure 19:
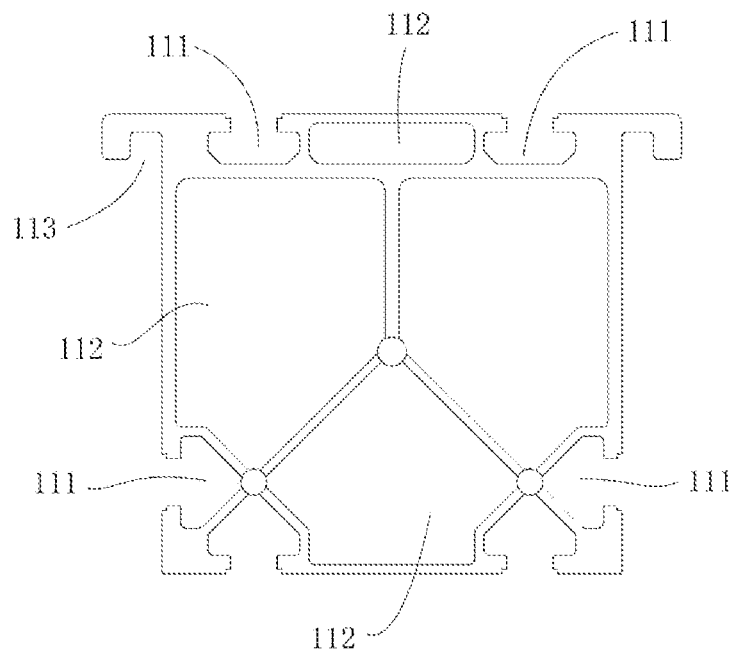
FIG. 19 is a schematic structural view of the beam member according to another embodiment of the present application.
Figure 20:
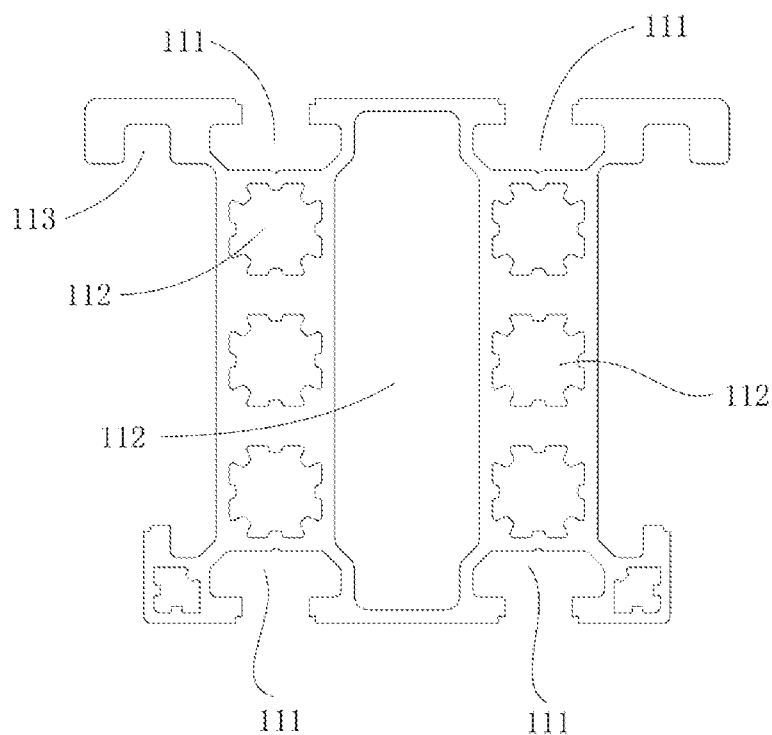
FIG. 20 is a schematic structural view of the beam member according to another embodiment of the present application.

Referring to FIGS. 11 to 20, in some embodiments such as the embodiments shown in FIGS. 12 and 13, in a case that the projection of the sidewall defining the cavity 112 in the extension direction of the beam member 11 is quadrilateral, the projection may be a rectangular shape. Of course, in some embodiments, as shown in FIGS. 14 to 20, the projection of the sidewall defining the cavity 112 in the extension direction of the beam member 11 may be an irregular polygon, for example, an irregular polygon. Moreover, in some embodiments, the projection of the sidewall defining the cavity 112 in the extension direction of the beam member 11 may be a honeycomb shape as shown in FIG. 20.

Moreover, as an optional embodiment, in the support device 1 according to the above embodiments, the number of cavity 112 of each beam member 11 may be one or more. In a case that multiple cavities are provided, shapes of these cavities 112 may be the same or different. For example, some cavities 112 may be of a regular-polygon shape, some cavities 112 may be of an irregular-polygon shape, and some cavities 112 may be of a honeycomb shape, as long as the strength requirements of the beam member 11 and the requirements of reducing weight and cost can be met.

Referring to FIGS. 11 to 22, as an alternative embodiment, in the support platform 20 according to the above embodiments, at least the beam member 11 connected to the support platform 20 among the multiple beam members 11 further includes a second sliding groove 113, and the support device 1 further includes a third connecting member 70 and a third fastener 80. The third connecting member 70 includes a first snapping end 71 and a second snapping end 72 that are sequentially arranged. At least part of the first snapping end 71 extends in the second sliding groove 113 and engages with the side wall defining the second sliding groove 113. The second snapping end 72 abuts against the support platform 20 and is detachably connected to the support platform 20 through the third fastener 80. Through the above arrangement, the requirements of connection strength between the support platform 20 and the support frame 10 can be guaranteed, and the second snapping end 72 abuts against the support platform 20 and is detachably connected to the support platform 20 through the third fastener 80, which facilitates the disassembly and assembly between the support platform 20 and the support frame 10 and facilitates the transportation of the support device 1.

Optionally, in a case that the beam member 11 includes the second sliding groove 113, the number of the second sliding groove 113 of the beam member may be one or more, such as two. Two second sliding grooves 113 may be symmetrically arranged, the extension direction of the first sliding groove 111 of a beam member 11 may be the same as the extension direction of the second sliding groove 113 of the same beam member 11, and each first sliding groove 111 of the same beam member 11 may be arranged between the two second sliding grooves 113. Each second sliding groove 113 is provided with at least one third connecting member 70 connected to the support platform 20. Through the above arrangement, the connection strength between the support frame 10 and the support platform 20 is improved.

Figure 21:
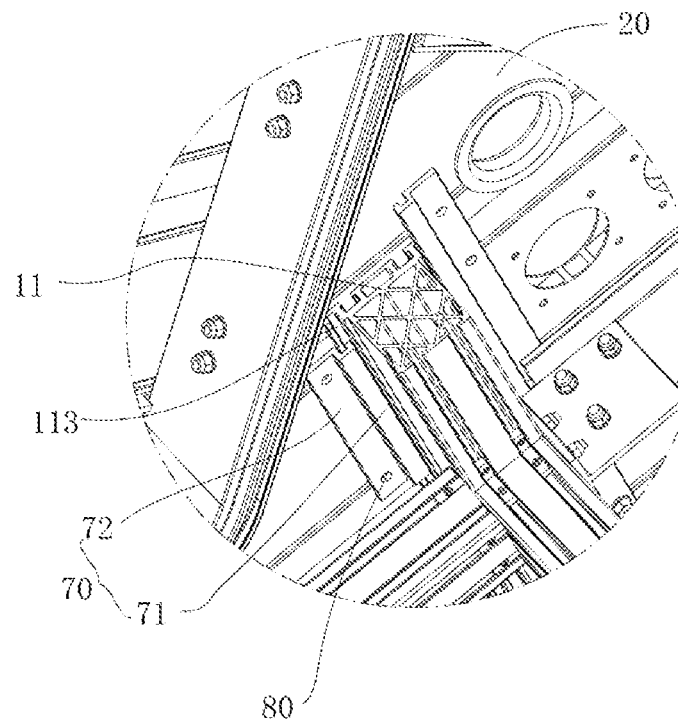
FIG. 21 is another partial enlarged view of the support device according to an embodiment of the present application.
Figure 22:
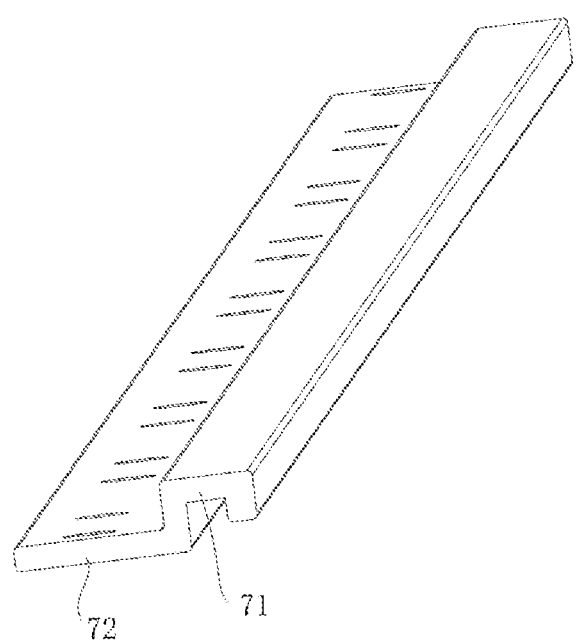
FIG. 22 is a schematic structural view of a third connecting member according to an embodiment of the present application.
Figure 23:
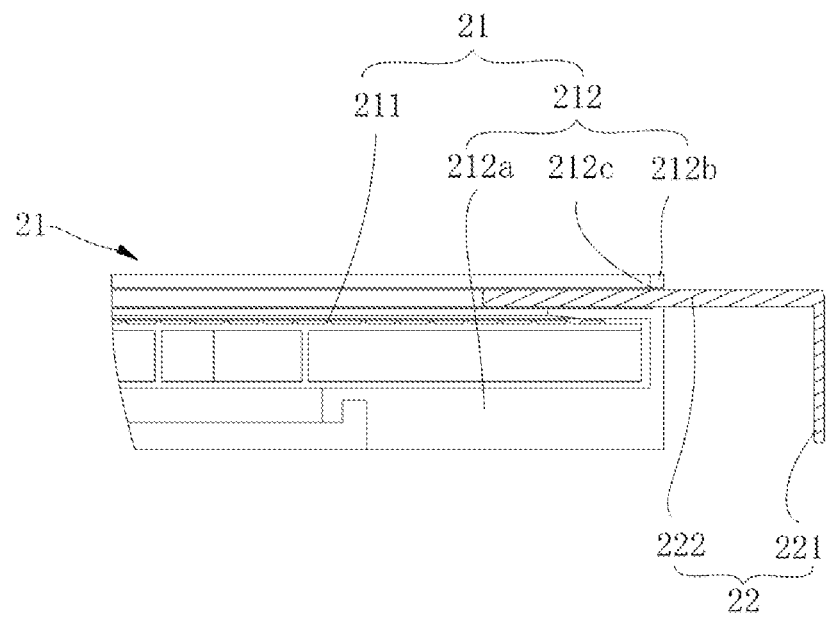
FIG. 23 is another partial enlarged view of the support device according to an embodiment of the present application.
Figure 24:
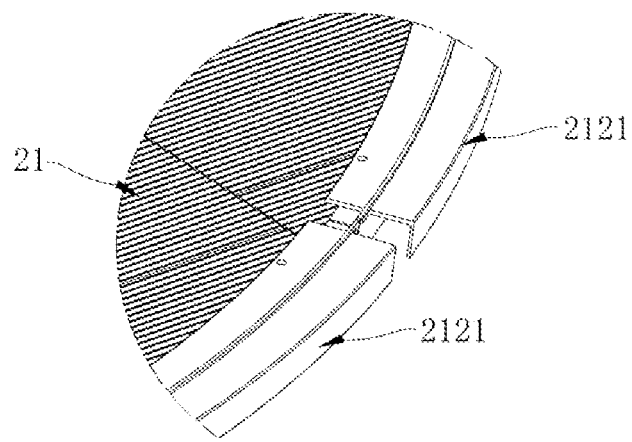
FIG. 24 is another partial enlarged view of the support device according to an embodiment of the present application.

As an alternative embodiment, as shown in FIGS. 21 and 22, the first snapping end 71 of the third connecting member 70 may be of a U-shaped plate structure, and the second snapping end 72 may be of a flat plate structure. A side wall of the first snapping end 71 may extend into the second sliding groove 113 and engage with the second sliding groove 113, and the second snapping end 72 may be attached to a body portion 21 and be detachably connected to the body portion through the third fastener 80.

Optionally, in the above embodiments, the first fastener 40, the second fastener 60, and the third fastener 80 may be bolts, screws, jackscrews, and the like.

Referring to FIGS. 2 to 4, FIG. 23 and FIG. 24, in some optional embodiments, in the support device 1 according to the above embodiments, the support platform 20 may include a body portion 21 and a surrounding plate 22 arranged around the body portion 21, and the surrounding plate 22 is movably connected with the body portion 21, so that the dimension of the outer edge of the support platform 20 is adjustable. Through the above arrangement, the support device 1 can better adapt to the dimension change of the tower 2 of the wind turbine, so that the overall dimension of the outer edge of the support platform 20 can be adjusted according to the dimension of the tower 2, and the outer edge of the support platform 20 can abut against the inner wall of the tower body 2a of the tower 2 or the gap between the outer edge of the support platform and the inner wall of the tower body 2a is kept within a required range, thereby meeting the support requirements of the electrical equipment 3.

In some optional embodiments, in the support device 1 according to the above embodiments, the body portion 21 includes a support plate 211 and an enclosing part 212 wrapping the outer periphery of the support plate 211. The enclosing part 212 has a horizontal extension portion 212a and a vertical installation portion 212b stacked above the horizontal extension portion 212a in the height direction Y. The vertical installation portion 212b defines an adjustment groove 212c, and the surrounding plate 22 is inserted into the adjustment groove 212c and is in clearance fit with the adjustment groove 212c. In the height direction Y, at least part of the surrounding plate 22 overlaps with and is detachably connected with the body portion 21.

Through the above arrangement, the structure of the body portion 21 can be simplified, and the connection between the body portion 21 and the surrounding plate 22 and the adjustment of the relative position between the body portion and the surrounding plate can be facilitated. The surrounding plate 22 can slide along the adjustment groove 212c on the vertical installation portion 212b to adjust the overall dimension of the outer edge of the support platform 20, that is, to adjust the overall dimension of the support platform 20 in the radial direction of the tower 2, so that the support device can better adapt to the tower 2 with different radial dimensions. Besides, the problem of interference between the support device 1 and the tower 2 during assembly due to errors during processing and manufacturing can be avoided, so that the support device 1 has better versatility and adaptability.

As an optional embodiment, in the height direction Y, at least part of the surrounding plate 22 overlaps with the body portion 21, and the relative position between the overlapped portions can be locked by screw rods, positioning pins and other fasteners.

In some optional embodiments, in the support device 1 according to the above embodiments, the surrounding plate 22 includes a pressing portion 221 and an adjustment portion 222 that are intersected and connected with each other, the adjustment portion 222 is arranged around the body portion 21, and the adjustment portion 222 is inserted into the adjustment groove 212c and is detachably connected with the body portion 21. The above structural form of the surrounding plate 22 can meet the requirements of adjusting the relative position between the surrounding plate and the body portion 21, and can ensure that the pressing portion 221 better abuts against the inner wall of the tower body of the tower 2 to meet the ensure the safety support requirements of the support device 1 for the electrical equipment 3.

Optionally, the pressing portion 221 and the adjustment portion 222 may both be of a plate-like structure, which can reduce the weight of the surrounding plate 22 and reduce the cost. Optionally, the pressing portion 221 and the adjustment portion 222 may be perpendicular to each other, which can ensure the reliability of the coordination between the surrounding plate 22 and the tower 2.

As an optional embodiment, in the support device 1 according to the above embodiments, the surrounding plate 22 includes multiple arc-shaped units 2121, and the multiple arc-shaped units 2121 are sequentially arranged along the outer edge of the body portion 21, and the relative position between each arc-shaped unit 2121 and the body portion 21 is adjustable. Through the above arrangement, the connection and position adjustment between the surrounding plate 22 and the body portion 21 can be facilitated, and the smooth movement of the body portion 21 relative to the surrounding plate 22 can be ensured to adjust the overall dimension of the outer edge of the support platform 20. Optionally, each arc-shaped unit 2121 is inserted into the adjustment groove 212*c* and is slidably connected to the adjustment groove 212*c*, and the relative position between each arc-shaped unit 2121 and the body portion 21 can be locked by screw rods, positioning pins and other fasteners.

Figure 25:
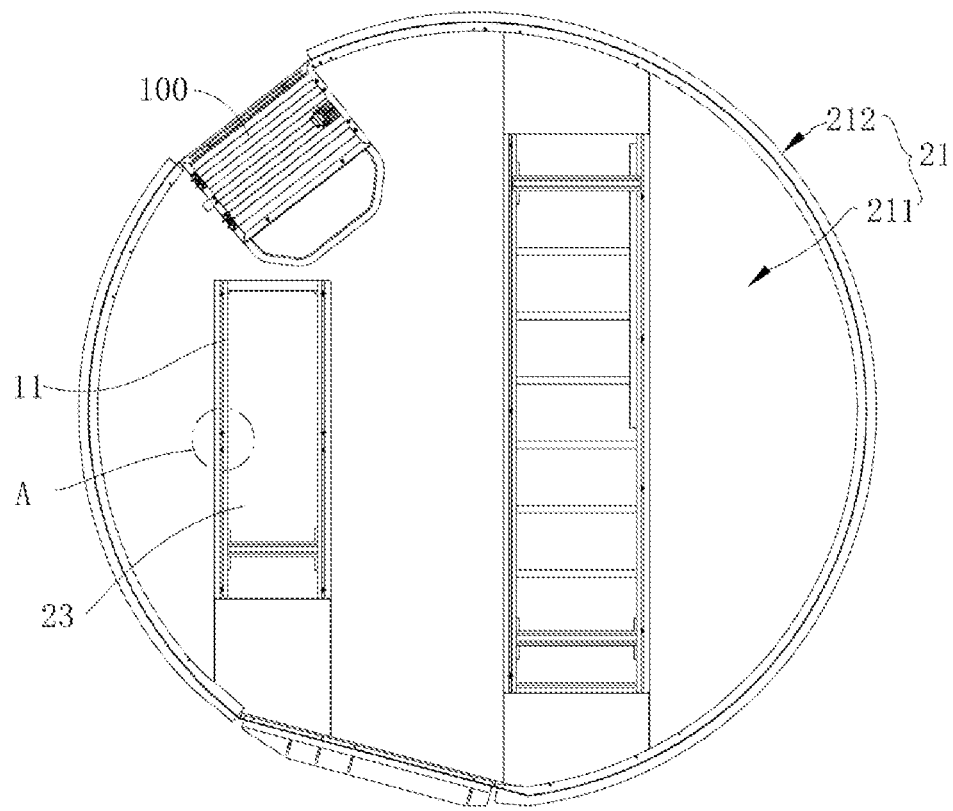
FIG. 25 is a top view of the support device according to another embodiment of the present application.
Figure 26:
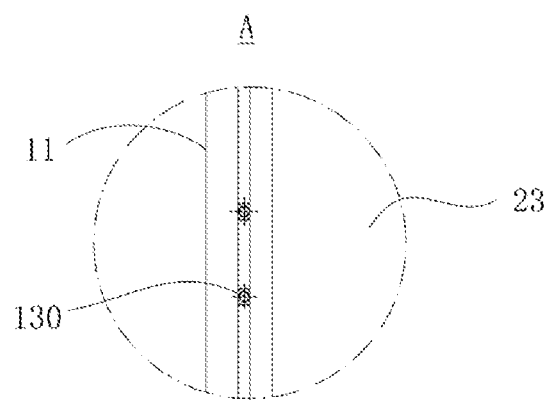
FIG. 26 is a partial enlarged view of portion A shown in FIG. 25.

Referring to FIGS. 25 and 26, as an optional embodiment, the support device 1 according to the above embodiments of the present application further includes an installation port 130, and the installation port 130 is movably connected with at least one beam member 11. By providing the installation port 130, the installation of the electrical equipment 3 can be facilitated, and the installation port 130 is movably connected to the corresponding beam member 11, so that the installation port 130 can be adjusted according to the position setting requirements of the electrical equipment 3 to ensure the connection requirements of the electrical equipment 3 and the support device 1.

In some optional embodiments, a notch 23 is provided on the support plate 211, and multiple notches 23 may be provided. The beam members 11 connected to the support platform 20 can be exposed on the surface of the support platform 20 away from the support frame 10 through some of the notches 23. In some optional embodiments, the installation port 130 may be connected through the second connecting member to where the beam members 11 are exposed at the support platform 20, so as to better meet the requirements of adjusting position between the installation port 130 and the corresponding beam member 11, and further meet the installation and connection requirements of the electrical equipment 3.

Referring to FIGS. 2 to 26, in some optional embodiments, the support device 1 according to the above embodiments further includes a height adjusting member 90 which is arranged on one side of the support frame 10 away from the support platform 20 and connected to at least part of the beam members 11 to adjust the height of the support platform 20. Through the above arrangement, the versatility of the support device 1 can be further improved, so the support device can meet support requirements of the electrical equipment 3 at different heights.

Optionally, the height adjusting member 90 is telescopic in the height direction Y. Optionally, the height adjusting member 90 is a telescopic cylinder. In some optional embodiments, the height adjusting member 90 includes an adjustment screw rod 91 and a connecting block 92. The connecting block 92 may be connected to the beam member 11 arranged along the height direction Y. The connecting block 92 is supported on the adjustment screw rod 91 through a position-limiting nut 93. By adjusting the position of the position-limiting nut 93 on the adjustment screw rod 91, the position adjustment requirement of the connecting block 92 on the adjustment screw rod 91 can be met to adjust the overall height of the support device 1.

As an optional embodiment, the support device 1 further includes a flip cover plate 100, and the flip cover plate 100 is movably connected in at least one notch 23. By providing the openable flip cover plate 100, it is convenient for the operator to pass.

In some optional embodiments, the support device 1 according to the above embodiments further includes a bridge frame 110, which is movably connected to at least one beam member 11. The bridge frame 110 is configured to place the wiring of the electrical equipment 3 to ensure the safety of the wiring. Moreover, the bridge frame 110 is movably connected to at least one beam member 11, so that the position of the beam member 11 on the support frame 10 can be adjusted according to the wiring requirements, and the versatility of the support device 1 can further be improved.

The optional bridge frame 110 may cooperate with the first sliding groove 111 of the corresponding beam member 11 through the first connecting member 30 or the second connecting member 50, so as to better realize the movable connection with the beam member 11 and ensure wiring requirements and/or avoidance requirements for other components.

In some optional embodiments, the support device 1 according to the above embodiments further includes a reinforcing support member 120, which is connected between the support frame 10 and the support platform 20. By providing the reinforcing support member 120, the connection strength between the support frame 10 and the support platform 20 can be further improved.

Optionally, the reinforcing support member 120 may be an oblique support, and the reinforcing support member 120 may be hinged to the support frame 10 and the support platform 20 respectively, which can ensure the requirement for strengthening the connection strength and facilitate the installation of the reinforcing support member 120.

Therefore, according to the support device 1 provided by the embodiments of the present application, the support device includes the support frame 10 and the support platform 20, the support platform 20 is configured to support and place the electrical equipment 3, and the support frame 10 is configured to support the support platform 20 and the electrical equipment 3 thereon at a predetermined height. Besides, since the support frame 10 has a hollow frame structure and includes multiple beam members 11 and the relative position between at least one group of two beam members 11 connected to each other is adjustable, the dimension and/or load-bearing capacity of the support frame 10 is adjustable, that is, the dimension and/or load-bearing capacity of the support frame 10 can be adjusted by adjusting the relative position between the beam members 11 connected to each other according to the project requirements, thereby improving the overall versatility of the support device 1. Therefore, the support device 1 can be widely used in the towers 2 of different types of wind turbines and support the electrical equipment 3.

Since the wind turbine includes the support device 1 provided by the above embodiments, which can support the electrical equipment 3 to a predetermined height, the wind turbine provided by the embodiments of the present application can adapt to requirements of number increase, position change or height change from the ground of the electrical equipment 3 through the support device 1, which can ensure the safety performance of the electrical equipment 3 and allow the wind turbine to have higher power generation efficiency.

Although the present application has been described with reference to the preferred embodiments, various improvements can be made to it and the components therein can be replaced with equivalents, without departing from the scope of the present application. In particular, as long as there is no structural conflict, the various technical features mentioned in the various embodiments can be combined in any manner. The present application is not limited to the specific embodiments disclosed herein, but includes all technical solutions falling within the scope of the claims.

The invention claimed is:

1. A support device for a wind turbine having electrical equipment, wherein the support device comprises:
    a support frame, and
    a support platform,
    wherein the support frame is of a hollow frame structure and comprises a plurality of beam members, adjacent beam members are connected to each other, and a relative position of at least one group of two beam members connected to each other is adjustable; and
    the support platform is arranged on a surface of the support frame in a height direction of the support frame and connected with the plurality of beam members, and the support platform is configured to support the electrical equipment.

2. The support device according to claim 1, wherein the support device further comprises a first connecting member, and at least two beam members intersect with each other and are connected by the first connecting member, wherein the relative position between the first connecting member and at least one beam member is adjustable, and the first connecting member is detachably connected with the at least one beam member.

3. The support device according to claim 2, wherein the beam member defines a first sliding groove, and the first connecting member comprises a first extension portion and a second extension portion which intersect with each other,
    the first extension portion is snapped in a first sliding groove of one of the two intersecting beam members, and the first extension portion is in sliding fit with the first sliding groove,
    the second extension portion is snapped in a first sliding groove of the other of the two intersecting beam members, and the second extension portion is in sliding fit with the corresponding first sliding groove; and
    the support device further comprises a first fastener, the first extension portion is provided with the first fastener, and/or, the second extension portion is provided with the first fastener, so as to lock the relative position between the first connecting member and the corresponding beam member.

4. The support device according to claim 1, wherein the support device further comprises a second connecting member, at least two beam members extend in a same direction and are arranged in sequence in an extension direction, and the two beam members that extend in the same direction and are arranged in sequence in the extension direction are connected to each other by the second connecting member, wherein the relative position between the second connecting member and the at least one beam member is adjustable and the second connecting member is detachably connected with the at least one beam member.

5. The support device according to claim 4, wherein the beam member defines a first sliding groove, the second connecting member is of a strip shape and comprises a first connecting end and a second connecting end that are oppositely arranged, the first connecting end is inserted in the first sliding groove of one of the two beam members that extend in the same direction and are arranged in sequence in the extension direction and the first connecting end is in sliding fit with the first sliding groove, and the second connecting end is inserted in the first sliding groove of the other of the two beam members that extend in the same direction and are arranged in sequence in the extension direction and the second connecting end is in sliding fit with the corresponding first sliding groove; and
    the support device further comprises a second fastener, the first connecting end is provided with the second fastener, and/or, the second connecting end is provided with the second fastener, so as to lock the relative position between the second connecting member and the beam member.

6. The support device according to claim 3, wherein the beam member is of a prismatic shape, at least one side wall surface of the beam member defines the first sliding groove recessed inwards, and the first sliding groove penetrates through the beam member in the extension direction.

7. The support device according to claim 1, wherein the beam member is made of a first material, and the first material comprises at least one of aluminum alloy, magnesium aluminum alloy, titanium alloy, aluminum silicon alloy, aluminum copper alloy, and aluminum zinc alloy.

8. The support device according to claim 1, wherein the beam member has a profile structure and has at least one cavity inside, and a projection of a side wall defining the cavity in the extension direction of the beam member is of a polygon or a honeycomb shape.

9. The support device according to claim 1, wherein the support platform comprises a body portion and a surrounding plate arranged around the body portion, the surrounding plate is movably connected with the body portion, and a dimension of an outer edge of the support platform is adjustable.

10. The support device according to claim 9, wherein the body portion comprises a support plate and an enclosing part wrapping an outer periphery of the support plate; and
    the enclosing part has a horizontal extension portion and a vertical installation portion stacked above the horizontal extension portion in the height direction, the vertical installation portion defines an adjustment groove, the surrounding plate is inserted into the adjustment groove and is in clearance fit with the adjustment groove, and in the height direction, at least part of the surrounding plate overlaps with and is detachably connected with the body portion.

11. The support device according to claim 10, wherein the surrounding plate comprises a pressing portion and an adjustment portion that are intersected and connected with each other, the adjustment portion is arranged around the body portion, and the adjustment portion is inserted into the adjustment groove and is detachably connected with the body portion.

12. The support device according to claim 10, wherein the surrounding plate comprises a plurality of arc-shaped units, and the plurality of arc-shaped units is sequentially arranged along an outer edge of the body portion, and a relative position between each arc-shaped unit and the body portion is adjustable.

13. The support device according to claim 1, wherein the beam member, at least connected to the support platform, of the plurality of the beam members, further defines a second sliding groove, and the support device further comprises a third connecting member and a third fastener; and the third connecting member comprises a first snapping end and a second snapping end that are sequentially arranged, at least part of the first snapping end extends in the second sliding groove and engages with a side wall defining the second sliding groove, the second snapping end abuts against the support platform and is detachably connected to the support platform through the third fastener.

14. The support device according to claim 1, wherein the support device further comprises a height adjusting member which is arranged on one side of the support frame away from the support platform and connected to at least part of the beam members to adjust the height of the support platform.

15. The support device according to claim 1, wherein the support device further comprises a flip cover plate, the support platform defines at least one notch, and the flip cover plate is movably connected in the at least one notch.

16. The support device according to claim 1, wherein the support device further comprises a bridge frame, which is movably connected to at least one beam member.

17. The support device according to claim 1, wherein the support device further comprises a reinforcing support member, which is connected between the support frame and the support platform.

18. The support device according to claim 1, wherein the support device further comprises an installation port, and the installation port is movably connected with at least one beam member.

19. A wind turbine, comprising:
a tower, which comprises a tower body and an accommodation space defined by the tower body;
the support device according to claim 1, which is arranged in the accommodation space; and
electrical equipment, which is installed on the support platform of the support device.

* * * * *